United States Patent [19]
Mortenson

[11] 4,275,894
[45] Jun. 30, 1981

[54] HAND TRUCK CONSTRUCTION ASSEMBLY

[75] Inventor: Carl N. Mortenson, Midland, Mich.

[73] Assignee: Magline, Inc., Pinconning, Mich.

[21] Appl. No.: 954,307

[22] Filed: Oct. 24, 1978

[51] Int. Cl.³ .......................... B62B 5/02; B62B 1/00
[52] U.S. Cl. ................................ 280/5.24; 280/47.29;
280/654; 280/655
[58] Field of Search ...................... 280/654, 655, 47.29,
280/47.28, 47.27, 5.24, 5.2, 651, 652

[56] References Cited
U.S. PATENT DOCUMENTS

| 2,514,849 | 7/1950 | Dewing | 280/659 |
| 2,693,968 | 11/1954 | Bateman et al. | 280/651 |
| 3,443,821 | 5/1969 | Alexander | 280/659 |
| 3,997,182 | 12/1976 | Mortenson | 280/47.27 |
| 4,040,642 | 8/1977 | David | 280/654 |
| 4,046,391 | 9/1977 | Restad et al. | 280/47.27 X |
| 4,072,319 | 2/1978 | Berger | 280/654 X |
| 4,121,855 | 10/1978 | Mortenson | 280/654 |

FOREIGN PATENT DOCUMENTS

| 2102932 | 3/1972 | France | 280/654 |
| 169242 | 9/1921 | United Kingdom | 280/47.29 |

Primary Examiner—Randolph A. Reese
Assistant Examiner—Milton L. Smith
Attorney, Agent, or Firm—Learman & McCulloch

[57] ABSTRACT

A hand truck having a wheeled upright frame is provided at its lower end with a load-supporting nose member swingable between raised and lowered positions, the nose member being biased to its raised position and provided with detent means for releasably latching the nose member in its lowered position. The nose member is pivoted to the upright frame in such manner that when the nose member is in its lowered, load-supporting position the nose member abuts and is supported by the upright frame member, thereby reinforcing the nose member without the need for external bracing. The upright frame carries an extensible and retractable subframe to enable the truck to be used for transporting loads of greatly varying height.

7 Claims, 9 Drawing Figures

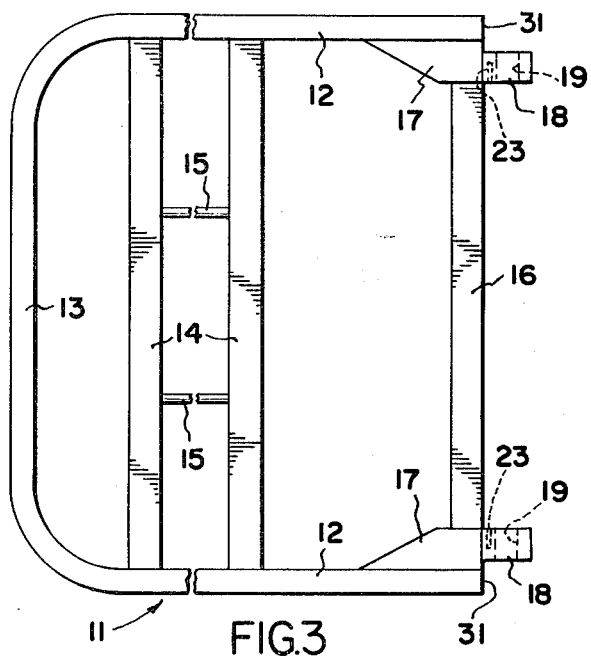
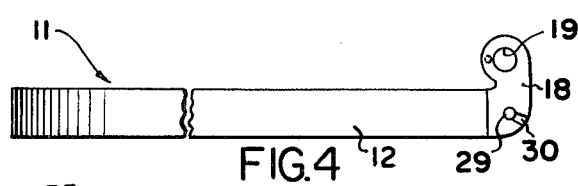
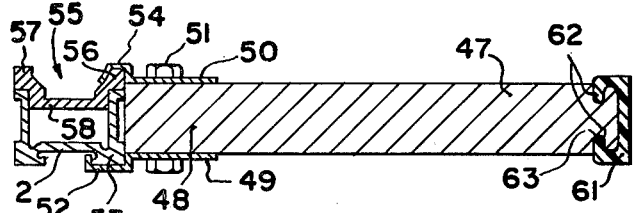
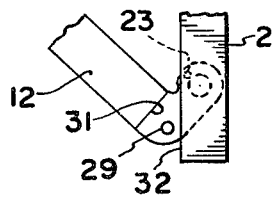
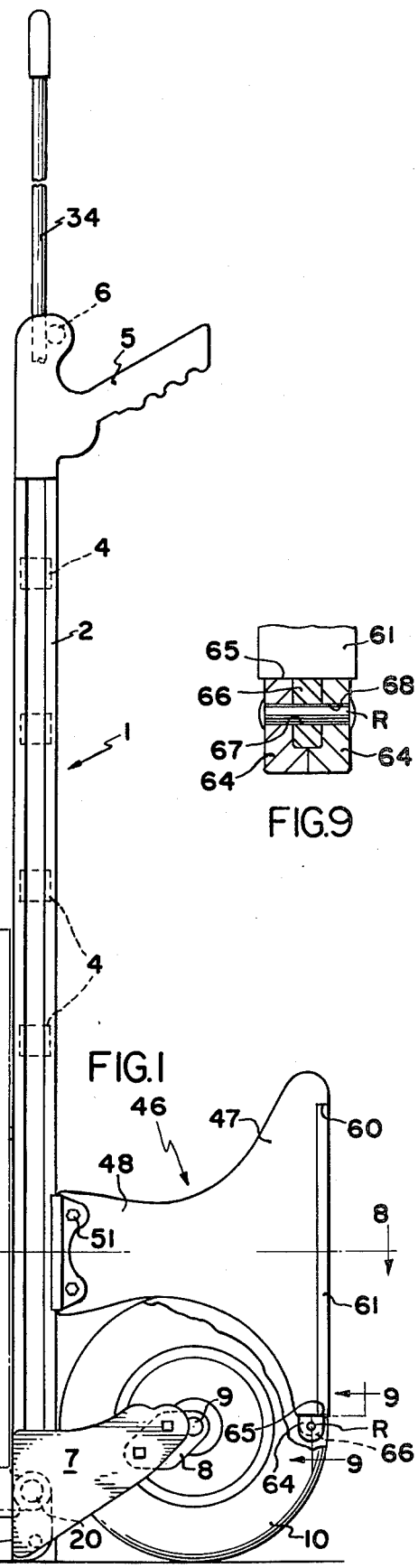

HAND TRUCK CONSTRUCTION ASSEMBLY

This invention relates to a wheeled hand truck of the kind adapted to be used in the manual transport of various kinds of goods. When not in use in the transport of goods it is desirable that the truck occupy a minimum of space, either during storage of the truck or when moving an unladen truck from one position to another. Minimization of the space required by a truck conventionally is effected by providing an upright wheeled frame at the lower end of which is pivoted a load-supporting nose member which is swingable between raised and lowered positions. When the truck is in use, the nose member is swung to a lowered, load-supporting position to provide a base upon which a load may rest. When the load has been removed from the truck, the nose member may be swung or retracted to a raised position substantially parallel to the main frame. Since the load-supporting nose member can be swung upwardly to a retracted position adjacent and parallel the main frame, the nose member may be of considerable area, but the ability of the nose member to be retracted enables the overall truck size to be considerably reduced.

The loads to which a hand truck is subjected can vary within wide limits, particularly in those instances in which the truck is used for the handling of baggage in airports and the like. If a truck includes a pivotable load-supporting nose member, it is not uncommon for the excess weight of a load to bend or otherwise damage the hinge structure, thereby interfering with the free movements of the nose member between its extended and retracted positions. To overcome this tendency, it is not uncommon for a swingable nose member to be provided with an external brace or reinforcing structure, but the presence of such structure often limits the width of articles which may be handled conveniently by the truck. One of the objects of this invention, therefore, is to provide for a reinforcement of the hinge structure of the swingable nose member of a hand truck without the necessity of external braces.

There are many occasions when a specific load to be transported by a hand truck comprises a large number of lightweight packages which easily can be transported in stacked form by the truck. The height of the stack is limited, however, to about the height of the truck's upright frame. Thus, it is not uncommon for the transfer of a stack of packages to require multiple load transferring trips which could be reduced if the height of the stack loaded on the truck could be increased. It is another object of this invention, therefore, to provide a sub-frame for a hand truck which is capable of movement from a retracted position to an extended position in prolongation of the truck's main upright frame, thereby effectively increasing the height of a load which may be transported by the truck.

Hand trucks often must be used in transporting loads up and down staircases. In the absence of a skid or the like at the rear of the truck frame, difficulty often is encountered in negotiating the steps of the staircase without undue jostling of the load. A further object of the invention, therefore is to provide a device for facilitating the use of a hand truck on staircases, which device can be original equipment or an option accessory.

Other objects and advantages of the invention will be referred to specifically or will become apparent from the following description when it is considered in conjunction with the accompanying drawings, in which:

FIG. 1 is a side elevational view of a hand truck constructed in accordance with the invention;

FIG. 3 is a fragmentary, top plan view of the nose member;

FIG. 4 is a fragmentary, side elevational view of the nose member;

FIG. 5 is a fragmentary, side elevational view illustrating the nose member in an intermediate position between its load-supporting and retracted positions;

FIG. 8 is a sectional view taken along the line 8—8 of FIG. 1; and

FIG. 9 is an enlarged cross-sectional view taken on the line 9—9 of FIG. 1.

Figure 2:
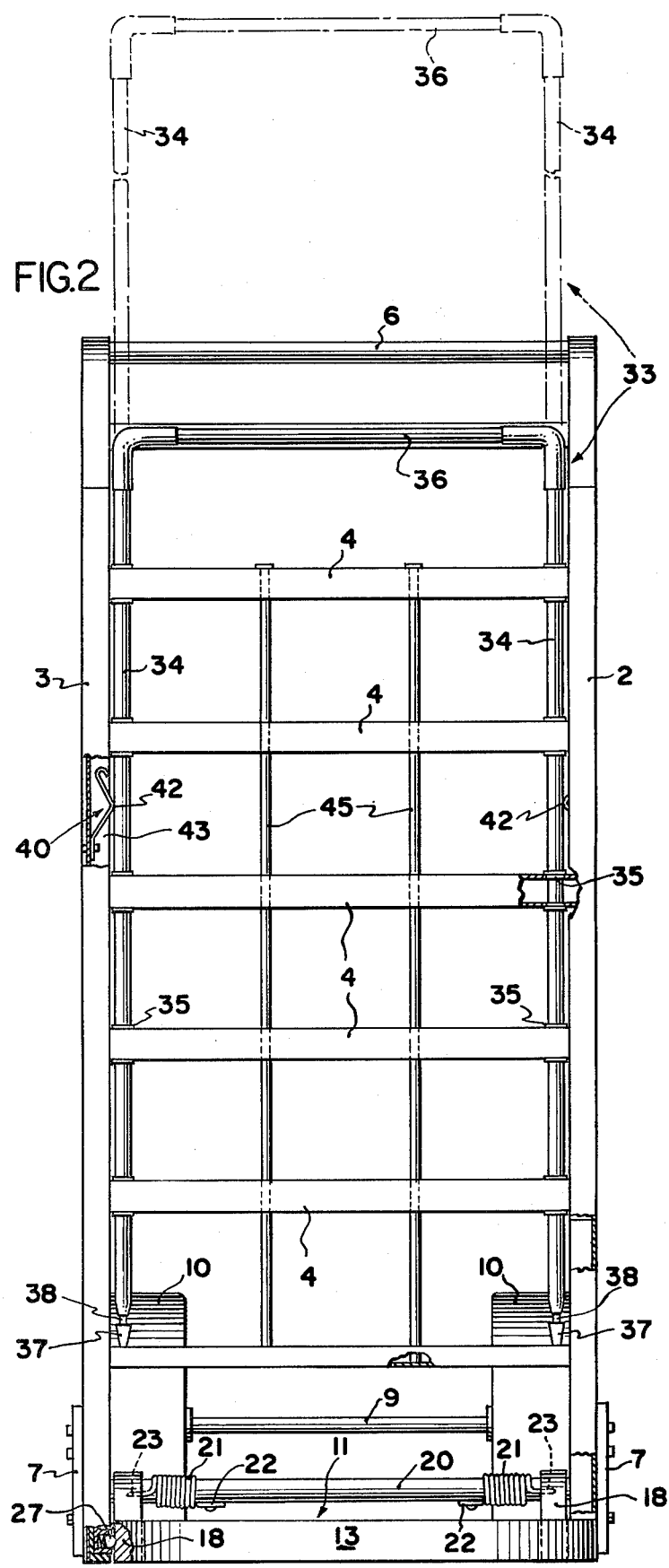
FIG. 2 is a front elevational view of the hand truck, with parts broken away for clarity.

A hand truck constructed in accordance with the disclosed embodiment of the invention comprises an upright main frame 1 having parallel, channel-shaped frame members 2 and 3 spaced apart by a plurality of crossbars 4. At the upper end of each of the frame members 2 and 3 is a pistol grip handle 5 joined by a crossrail 6 which serves as a handlebar. Adjacent the lower end of each frame member 2 and 3 is fixed a bracket 7 provided with a plate 8 in which is secured an axle 9. Ground engaging wheels 10 are journaled at opposite ends of the axle 9.

The hand truck also includes a load-supporting nose member 11 comprising a generally U-shaped frame having parallel rails 12 spaced by a forward web 13 and a plurality of parallel crossbars 14. Preferably, the crossbars 14 are interconnected by stringers 15. The rearward ends of the rails 12 are spanned by a bar 16 having enlargements 17 at its opposite ends which are welded or otherwise suitably secured to the rails 12. Forming part of the enlargements 17 are rearwardly extending and upstanding mounting arms 18 each of which has an opening 19 adjacent its free end. The arms 18 are laterally offset to lie inboard of and along side the associated rails 12 by a distance corresponding substantially to the width of the associated frame members 2 and 3 and extend upwardly beyond the confines of the frame members 12 for a purpose presently to be explained.

Means for pivotally mounting the nose member 11 on the main frame 1 comprises a rod 20 which rotatably extends through the openings 19 in the mounting arms 18 and has its opposite ends fixed to the frame members 2 and 3. The nose member 11 thus is capable of swinging movement about the axis of the rod 20 from an extended, load-supporting position shown in full lines in FIG. 1 to an elevated, retracted position shown in chain lines in FIG. 1.

It is preferred that the nose member 11 be biased to its raised, retracted position so as to avoid movement to its extended position except when desired. The biasing means is best shown in FIG. 2 and comprises a pair of coiled springs 21 encircling the rod 20. One end of each spring is fixed to the rod 20 by a clip 22 and the other end of each spring is fitted into an opening 23 formed in the associated mounting arm 18. Each of the springs 21 is so stressed that it urges the nose member 11 to swing upwardly.

Since the nose member 11 is biased to swing upwardly, it is preferred that it be positively, but releasably, latched in its load-supporting position when desired. The latching means comprises a pair of ball retainers 24 (FIG. 7) each of which is fitted into a recess 25 formed in the associated frame member 2 and 3 and fixed to the latter by a bolt 26. Within each ball container 24 is a detent ball 27 that is urged by a spring 28 in a direction outwardly of the retainer. Each of the mounting arms 18 is provided with a ball-accomodating socket or dimple 29 (FIGS. 4 and 5). Leading into each dimple 29 is a guide groove 30 which is of less depth than that of the dimple.

Figure 7:
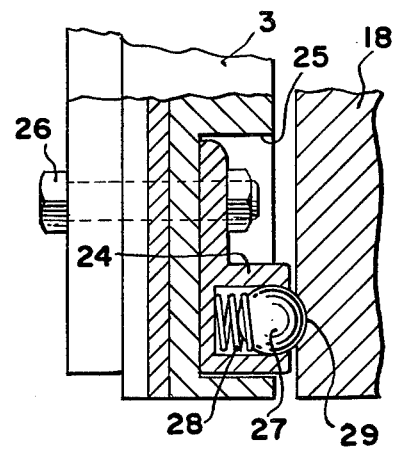
FIG. 7 is a greatly enlarged, partly elevational and partly sectional view of a detail shown in FIG. 2.

When the nose member 11 is in its lowered, load-supporting position, the balls 27 are seated in their associated dimples 29 as shown in FIG. 7. The force of each spring 28 is so selected that the balls 27 engage the walls of the dimples under sufficient force to overcome the force of the springs 21 and releasably latch the nose member in its lowered position. The springs 28, however, are sufficiently resilient to enable the nose member to be swung upwardly, whereupon the balls 27 will be retracted inwardly of their retainers 28.

An important characteristics of the invention is the relationship between the main frame 1 and the nose member 11 when the latter is in its load-supporting position. As was stated earlier, the mounting arms 18 are located inboard of the opposite sides of the nose member 11 a distance corresponding substantially to the width of the respective frame members 2 and 3. In addition, the pivoting of the arms 18 to the frame members is at a point spaced above the lower ends of the frame member. The rear ends 31 of the rails 12 thus are enabled to seat upon the lower ends 32 of the frame members 2 and 3 when the nose member is in its lowered, load-supporting position, thereby providing support for the nose member and reinforcement for the hinge mounting of the nose member. As a consequence, the likelihood of springing the nose member or damaging the hinge structure is minimized.

Figure 6:
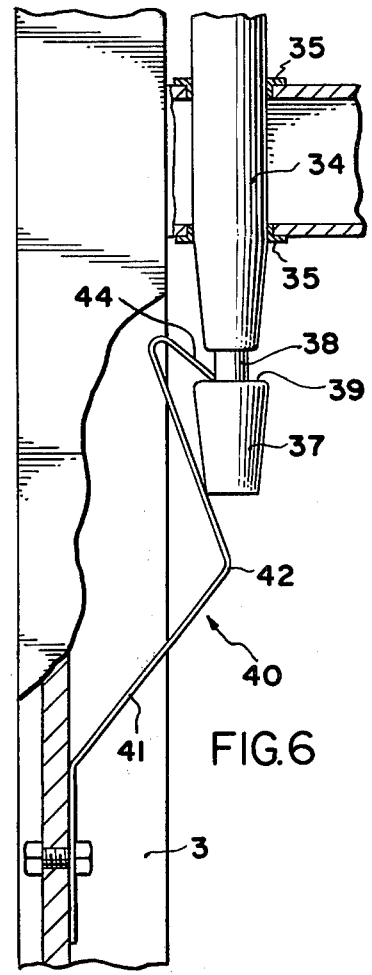
FIG. 6 is an enlarged, partly elevational and partly sectional view of a detail illustrated in FIG. 2, but with the parts in adjusted position.

A hand truck constructed according to the invention preferably includes a subframe 33 that is extensible and retractable relative to the main frame 1 to enable the truck to support a higher stack of articles than otherwise would be the case. The subframe comprises a pair of spaced apart rods 34 slidably accommodated in bushings 35 carried by the crossbars 4, the rods 34 being joined at their upper ends by a cross member 36. At the lower end of each rod 34 is a tapered fitting 37 having a reduced neck portion 38 which forms an abutment or shoulder 39. A spring latch 40 is associated with each rod 34 and comprises a spring arm 41 fixed at one end to the associated frame member 2 and 3 and having a knee portion 42 which projects through a slot 43 formed in the frame member. The free end of each spring member 42 terminates in a finger 44 which is adapted to engage the shoulder 39 of the fitting on the association rod 34 so as to form an upper limit to which the subframe 33 may be extended (see FIG. 6). The knees 42 at all times bear against the associated rods 34 to retain the subframe in any selected position of vertical adjustment.

When the subframe 33 is in its extended position, it extends above and in prolongation of the main frame 1 a substantial distance so as to provide support for articles which may be stacked to a height greater than that of the main frame. The subframe is in sliding engagement with and bears against the dual function handlebar 6 when in its extended position to reduce the bending load on rods 34.

If it is expected that the hand truck will be used to transport packages and the like of small size, a plurality of auxiliary rods 45 may be extended through openings in the cross members 4 of the main frame so as to minimize the possibility of small articles passing between the adjacent crossbars. Similar auxiliary rods (not shown) may be fitted to the subframe 33.

If it is desired to use the hand truck on stair cases, a skid or stair climber member 46 may be fitted to each frame member 2 and 3 at its rear end. Each member 46 comprises a body 47 having a forwardly extending arm 48 adapted to abut the rear surface of the associated frame member 2 or 3. A pair of clamps 49 and 50 straddle the arm 48 and are secured to the latter by bolts 51. The clamp 49 terminates at its forward end in a clasp-like portion 52 which nests with a rib 53 formed on the upright frame member and the clamp 50 terminates at its forward end in a similar clasp-like portion 54. Since each of the upright frame members is channel-shaped, it is preferred that a generally U-shaped reinforcing insert 55 be fitted at the open side of each upright frame member. Each insert has side rails 56 and 57 joined by a web 58 which fits snugly between the opposed sides of the frame member to prevent movement of such sides toward one another. The clasps 52, 54 embrace the side rail 56 to secure the member 46 to the associated frame member.

The rearward edge of the body 47 preferably is notched to provide a shoulder 60 against which an abrasion resistant synthetic plastic wear strip 61 is received. The strip is retained on the body 47 by rolling the opposite edges of the strip inwardly toward one another to form tongues 62 (FIG. 8) that are fitted into grooves 63 provided in the body 47. In any event, the rear edge of each member 46 is smooth. The strip 61 slides into position on tongues 62 until it reaches abutment shoulders 60. At the opposite end cup-shaped members 64 provide a shoulder 65 to hold strip 61. The mating interchangeable members 64, which can be removed to replace strip 61 and fit over a tongue 66 extending from stair climber body 47 are secured in position by a rivet, bolt, or other fastener R extending through an opening 67 in tongue 66 and an opening 68 in each member 64.

The fore and aft length of each stair climber member 46 is such that, when installed on the truck, the rear edge of the member is substantially flush with a plane tangential to the associated wheel. Its lower edge is substantially aligned with the axis of axle 9. Thus, when the truck is used to transport a load either up or down the steps of a staircase the rear edges of the members 46 may engage and slide upon the forward edge of a stair tread. The members 46 are secured to the hand truck at a suitable height above the lower ends of the frame members 2 and 3 to ensure the avoidance of interference between the ground and the members 46 when the hand truck is tipped and moved along the ground. Moreover, each member 46 is secured to the frame 1 in such position that the height of each member 46 above ground level is at least as great as the height of the riser portion of a typical staircase.

The construction of the stair climbers is such that they can be included as part of the original equipment of the hand truck, or subsequently added to the latter as an accessory. In either case, each stair climber is supported wholly by its associated frame member and no modification of either the frame members or the stair climbers is required to mount or demount the stair climbers to or from the hand truck.

The disclosed embodiment is representative of the presently preferred form of the invention, but is intended to be illustrative rather than definitive thereof. The invention is defined in the claims.

What is claimed is:

1. A hand truck construction comprising an upright frame member; a load-supporting nose connected to said frame member at its lower end; a sub-frame member carried by said frame member for movements from a retracted position to an extended position in prolongation of said frame member, and return; cooperable latch means carried by said frame member and said sub-frame member for limiting movement of the latter in a direction in prolongation of said frame member; and resilient means carried by one of said members and engaging the other of said members for yieldably maintaining said sub-frame member in a selected position of adjustment relative to said frame member, said resilient means comprising an angular spring arm having a knee engaging said other of said members.

2. A construction according to claim 1 wherein said latch means comprises an abutment on one of said members and means carried by the other of said members in a position to engage said abutment.

3. A construction according to claim 2 wherein said abutment is on said sub-frame member.

4. A construction according to claim 1 wherein said upright frame member has an upper end crossbar and said sub-frame is mounted for sliding bearing engagement therewith so that the said crossbar functions both as a handlebar and as a load bearing support for the extended sub-frame.

5. A hand truck construction comprising an upright frame member having upper, lower, forward and rearward ends; a load supporting nose member carried by said frame member adjacent its lower end; ground engaging wheels mounted on said frame member adjacent its lower end; a pair of body members each having a rearward surface and parallel grooves adjacent its rearward surface; means mounting each of said body members on said frame member adjacent opposite sides thereof with said body members extending rearwardly of said frame member; and a smooth surface wear strip fitted to each of said body members, each of said wear strips being C-shaped and having flanges which may be slid into the grooves of the associated body member, said grooves terminating at one end in an abutment.

6. A construction according to claim 5 wherein said frame member comprises a pair of channel shaped rails having parallel sides, and wherein the mounting means for each of said body members comprises a part fitted between the sides of the associated rail and clasp members carried by such body member and embracing said part and a portion of said associated rail.

7. A construction according to claim 5 in which the opposite ends of said body members are formed with endwise projecting tongues of a width no greater than the space between said grooves so that the wear strip flanges will slide over it; and in which mating abutting end caps fit over each tongue and form an opposite shoulder for holding each insert in position; and fastener means is provided for holding the end caps in assembled position on the tongues.

* * * * *